US006596158B1

(12) United States Patent  (10) Patent No.: US 6,596,158 B1
Cowan  (45) Date of Patent: Jul. 22, 2003

(54) WASTE WATER FILTRATION TANK

(75) Inventor: Anthony Cowan, Irvine (GB)

(73) Assignee: G & K Valve Services Limited, Kilmarnock (GB)

( * ) Notice: Subject to any disclaimer, the term of this patent is extended or adjusted under 35 U.S.C. 154(b) by 0 days.

(21) Appl. No.: 09/958,965

(22) PCT Filed: Apr. 14, 2000

(86) PCT No.: PCT/GB00/01434
§ 371 (c)(1),
(2), (4) Date: Oct. 15, 2001

(87) PCT Pub. No.: WO00/62895
PCT Pub. Date: Oct. 26, 2000

(30) Foreign Application Priority Data

Apr. 15, 1999 (GB) .............................................. 9908506

(51) Int. Cl.⁷ .............................................. B01D 29/66
(52) U.S. Cl. ........................ 210/108; 210/123; 210/128; 210/112
(58) Field of Search ................................. 210/108, 111, 210/112, 123, 126, 128, 275, 411, 499

(56) References Cited

U.S. PATENT DOCUMENTS 3,841,485 A    10/1974  Malkin
3,948,773 A *   4/1976  Tucker .......................... 210/108
5,013,457 A     5/1991  Mims
5,288,399 A *   2/1994  Schulz
5,296,134 A     3/1994  Zaiter
6,132,626 A * 10/2000  Hart

FOREIGN PATENT DOCUMENTS

GB    1072171    6/1967

* cited by examiner

Primary Examiner—Joseph Dhodge
Assistant Examiner—Terry K. Cecil
(74) Attorney, Agent, or Firm—Drinker Biddle & Reath LLP

(57) ABSTRACT

A waste water filtration tank receives waste water under hydrostatic pressure. The tank collects solids using a filter screen. When the screen becomes clogged with collected solids, liquid is forced into a float chamber which contains a float. As waste water collects in the float chamber, the float rises, as do a beam member and a pair of rod members to which the float is attached. When the float reaches a predetermined level, cams contained on the rising rod members act on spring-loaded latches, opening the latches and permitting a spring loaded sleeve and reservoir gate to rise, opening the reservoir outlet. Accumulated solids are then drained from the reservoir and the backwash from the screen chamber also clears the clogged screen.

9 Claims, 4 Drawing Sheets

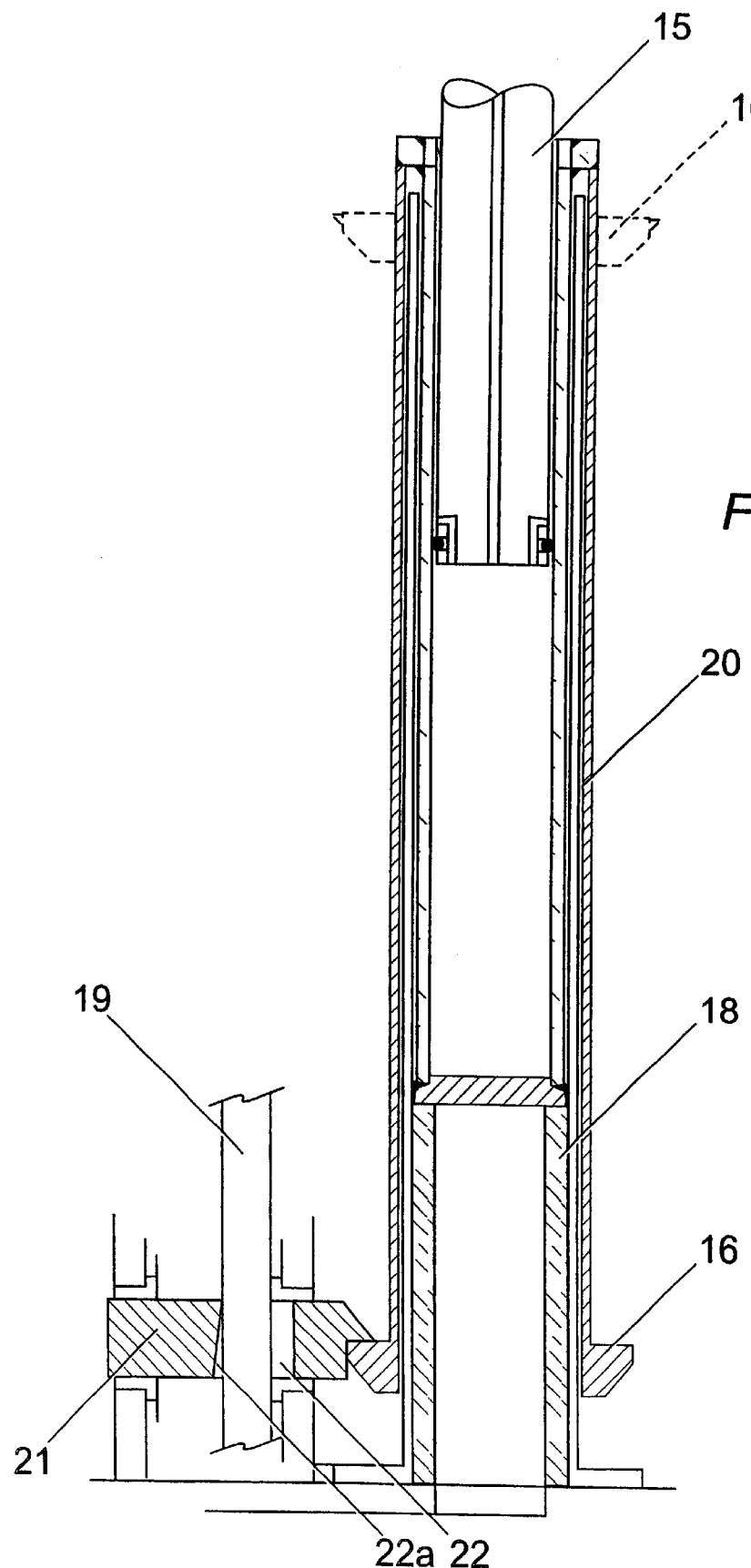

WASTE WATER FILTRATION TANK

This application is the U.S. national phase application of PCT International Application No. PCT/GB00/01434 filed Apr. 14, 2000.

FIELD OF THE INVENTION

The present invention relates to a waste water filtration tank for the treatment of raw waste water.

BACKGROUND OF THE INVENTION

Before waste water can be passed to processing plants such as water treatment facilities, all the solid waste within the effluent must be removed. It is known to use filtration tanks in order to remove such material, with the waste material being separated from the water before the water is either passed on for further processing or else, in some instances, discharged back into the river or sea. Other known methods of treatment include sand filtration and chemical treatment of the liquid to remove impurities.

SUMMARY OF THE INVENTION

It is the aim of the present invention to provide an automatic waste water flushing system which filters out solids from the effluent before automatically removing said solids from the tank, thereby allowing the filtration to be carried out with the minimum of supervision and also removing the need for the filtered solids to be discharged manually.

According to the present invention, there is provided a waste water tank for the filtering of solids from effluent, said tank comprising filtration means and automatic discharge means, wherein said discharge means discharges the filtered solids when said filter reaches a predetermined degree of contamination.

Preferably, said tank further comprises an inlet and first and second chambers, said filtration means being located between said inlet and said first chamber. Preferably, said effluent enters said inlet under hydrostatic pressure.

Preferably, said tank further comprises a reservoir which communicates with said inlet and each of said first and second chambers.

Preferably, said reservoir has a discharge outlet which moves between open and closed states under the action of said discharge means.

Preferably, said filtration means is a mesh screen adapted to prevent solids of a predetermined size from entering said first chamber from said reservoir.

Preferably, said tank is adapted so that liquid flows into said second chamber from said reservoir when said screen reaches said predetermined level of contamination.

Preferably, said discharge means comprises a float located within said second chamber, a gate covering said outlet, and operating means for the operation of said gate, wherein said float acts on said operating means when the level of liquid in said second chamber reaches a predetermined level.

Preferably, said operating means comprises a pivotable beam member, first and second rod members having first and second cams attached thereto, a flanged sleeve member attached to said gate, and a locking means, wherein said beam member and said first and second rod members are attached to said float, and wherein said beam member and said first and second rod members are adapted to communicate the movement of said float to said gate. Preferably, said operating means further comprises biasing means which forces said gate into the open position.

Preferably, said locking means comprises a pair of spring-loaded latches adapted to move between open and closed positions, said closed position being when said latches act on said flanged sleeve member and said open position being when said latches move away from said sleeve member under the action of said first and second cams, said gate opening under the action of said biasing means.

A preferred embodiment of the present invention will now be described, with reference to the accompanying drawings, in which:

BRIEF DESCRIPTION OF THE DRAWINGS

FIG. 7 is a detail view of the sluice mechanism as seen in FIG. 1.

DETAILED DESCRIPTION OF THE INVENTION

Figure 1:
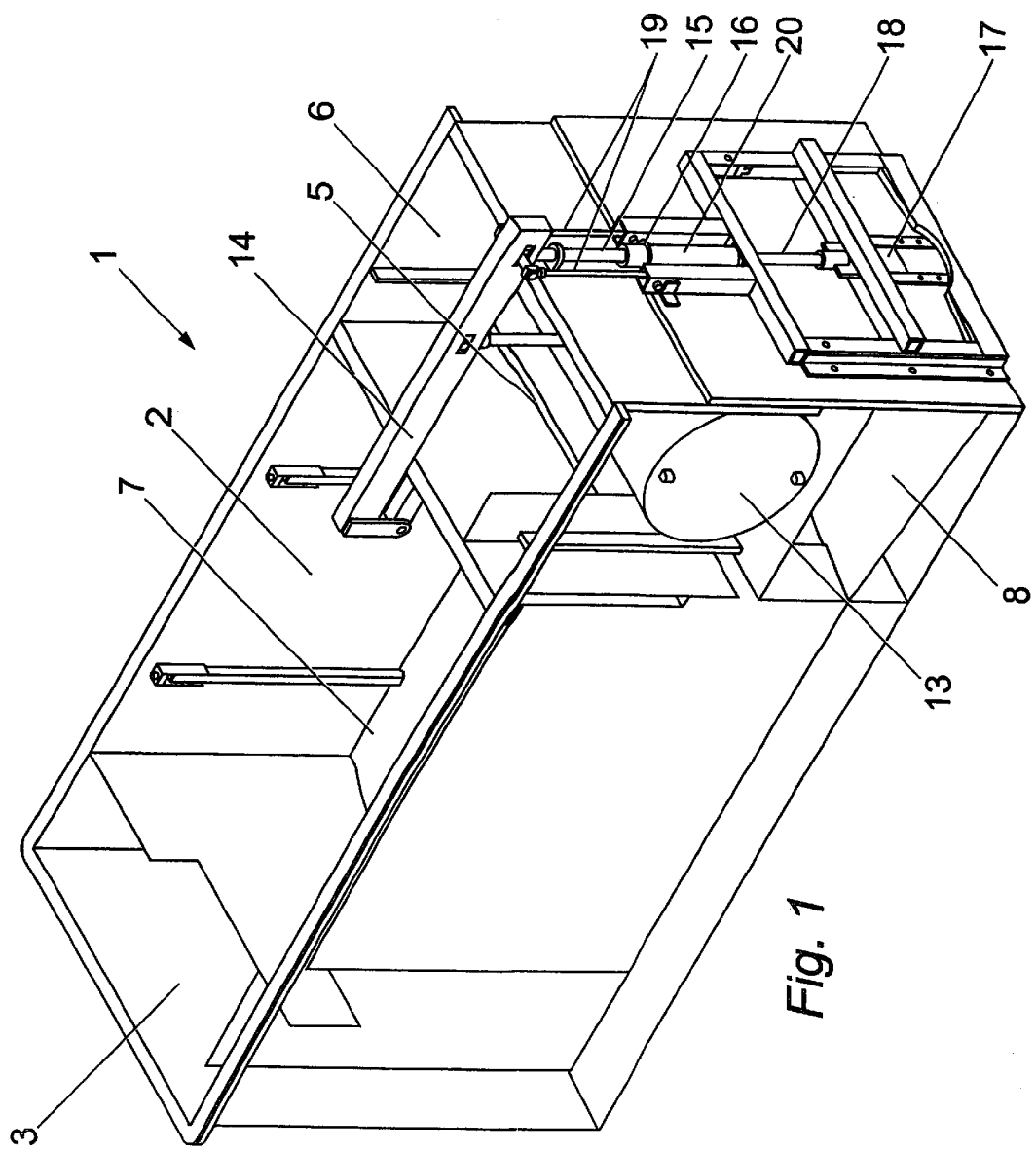
FIG. 1 shows a projected view of the filtration tank according to the present invention, the side wall of said tank having been removed for illustrative purposes.
Figure 2:
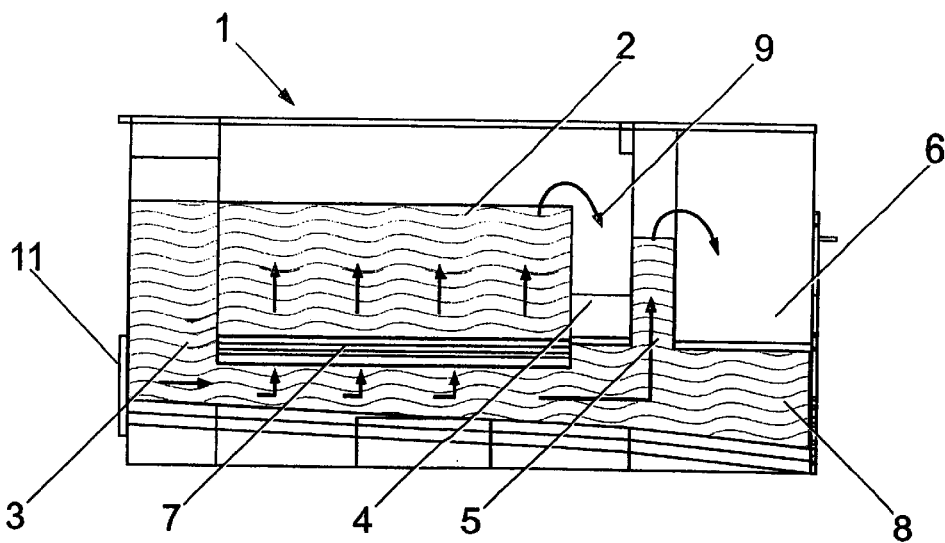
FIG. 2 shows a side elevation of the tank, with fluid flow directions highlighted.
Figure 3:
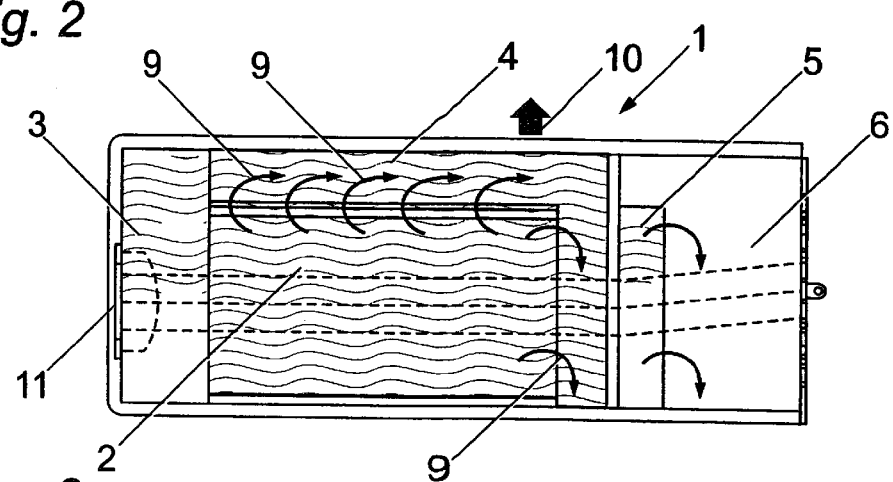
FIG. 3 shows a plan view of the tank as seen in FIG. 2.
Figure 4:
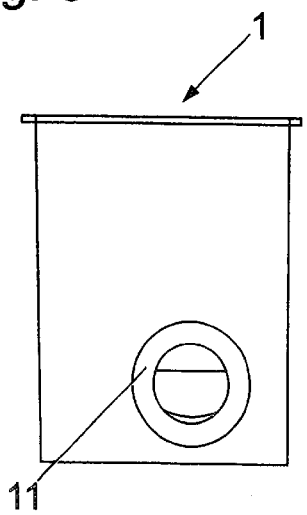
FIG. 4 shows a rear view of the tank as seen in FIGS. 2 and 3.
Figure 5:
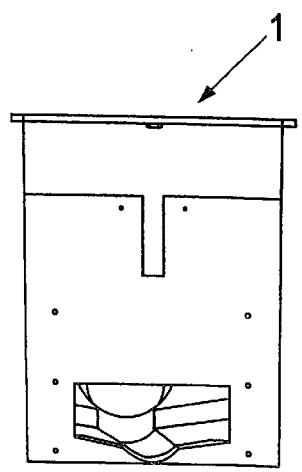
FIG. 5 shows a front view of the tank as seen in FIGS. 2 to 4.
Figure 6:
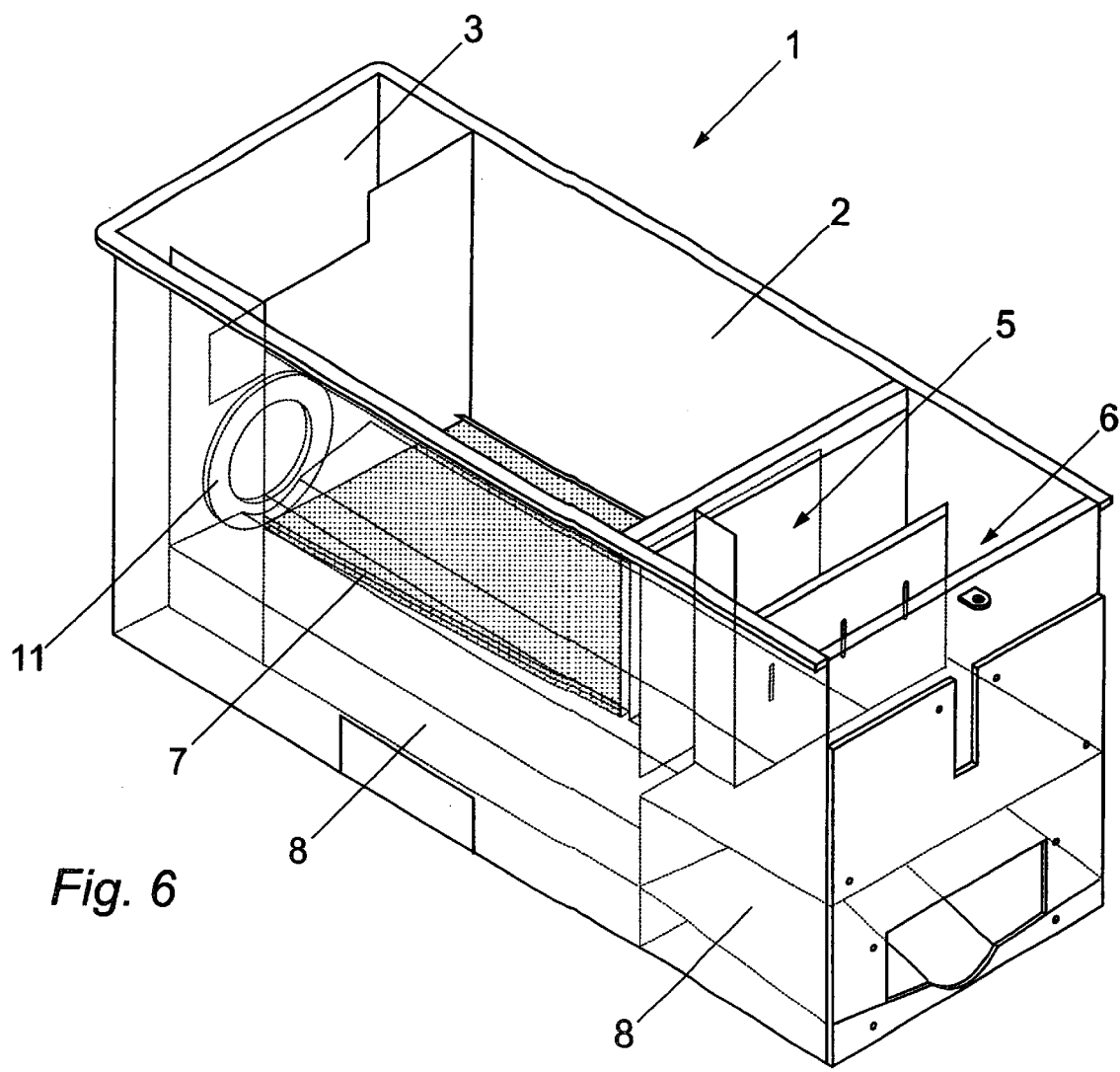
FIG. 6 shows a projected cut-away view of the tank as seen in FIGS. 2 to 5.

Referring to the drawings, FIG. 1 shows a waste water filtration tank 1 with a side wall panel removed for illustrative purposes. The tank 1 has an inlet chamber 3, and a screen chamber 2 which contains a screen 7. The unfiltered effluent is pumped into the inlet chamber 3 via pressure from a generated head through inlet flange 11. The head can either be generated by a pump or by gravity. The effluent flow fills the inlet chamber 3 and the reservoir 8 until it reaches a predetermined level whereupon in begins to pass upwards through the screen 7 into the screen chamber 2. As the effluent passes through the screen 7, solid residue is trapped in the reservoir 8 and cannot pass into the screen chamber 2. Due to the pressure generated in the head, the level of filtered liquid which enters the screen chamber 2 continues to rise until it begins to overflow 9 into an overflow chamber 4, which can be seen in FIGS. 2 and 3. The filtered liquid then passes out of the overflow chamber 4 via outlet 10 to be discharged for further treatment or else into a sea or river area.

The more solids which are filtered by the screen 7, the more blocked the screen 7 will become, thus restricting the flow of liquid through the screen 7 into the screen chamber 2. With the restricted flow through the screen 7, a back pressure is created in a stilling chamber 5 connected to the reservoir 8. As the screen 7 continues to clog, the back pressure increases in the stilling chamber 5, raising the level of liquid in the stilling chamber 5 until it begins to overflow into a float chamber 6.

The float chamber 6 contains a drum float 13 which will begin to rise as liquid enters the chamber 6. The float 13 is part of a mechanism which controls the automatic operation of a sluice gate 17. This gate control mechanism alleviates the need to flush the tank 1, as the tank 1 automatically flushes itself when solids have blocked the screen 7 to a certain degree.

As shown best in FIG. 1, the gate control mechanism consists of a pivoting beam 14 to which the float 13 is attached. Also attached to the beam 14 at the opposite end from the pivot are a rod member 15 and a pair of secondary rod members 19, with the rod member 15 passing down through a sleeve 20. The sleeve. 20 has a flange 16 around its circumference, and marries with the top of a sluice rod member 18 which is connected to a sluice gate 17. The sluice rod member 18 is acted on by a compressed spring (not shown) which acts upwards on the sluice rod, the sluice rod acting on the sleeve 20.

As the rise in fluid within the float chamber 6 lifts the float 13, the float 13 raises the beam 14,-which in turn lifts the rod member 15 and the secondary rod members 19. The pair of secondary rod members 19 each pass through spring-loaded latches 21 which hold the sleeve 20 in position via the flange 16. The latches 21 each have an aperture 22 through which the secondary rods 19 pass. These apertures 22 have a tapered inner surface 22a which is acted on by a cam (not shown) attached to the secondary rod 19. As the combination of the float 13 and beam 14 lift the secondary rods 19 to a predetermined level, the cams act on the respective inner surfaces 22a of the latches 21, thereby pushing the latches 21 outward against their springs (not shown). The outward movement of the latches 21 releases the flange 16 of the sleeve 20, sending the sleeve 20 and sluice rod 18 swiftly upwards under the force of the compressed spring. The rapid upward movement of the sluice rod 18 then opens the sluice gate 17, allowing the solid residue and fluid trapped in the reservoir 8 to be discharged.

As the reservoir 8 is discharged through the sluice gate 17, the level of fluid in the screening chamber 2 will quickly drop, thus backwashing the screen 7 to remove any solids on the underside. At the same time as the sluice gate 17 is opened, a dump valve (not shown) within the float chamber 6 opens, thus emptying the float chamber 6 at a controlled rate. As the float chamber 6 empties, the weight of the float 13 causes both the float and beam 14 to lower. With the lowering of the beam 14, the rod member 15 pushes the sleeve 20 and sluice member 18 down against the spring until the tapered flange 16 reengages with the latches 21. As the sleeve 20 lowers, it also lowers the sluice member 18 to compress the spring and close the sluice gate 17 against the flow of fluid through the inlet flange 11. The mechanism then automatically resets and begins the filtration cycle again Thus, the filtration tank 1 provides a filtration mechanism which filters the incoming effluent until such time as the filtering screen 7 becomes blocked. Then, without the need for operation by an operator, the mechanism will automatically discharge the filtered solids and begin the cycle again. Thus, the mechanism can operate with the minimum of supervision, and without the need for any manual intervention.

Modifications and improvements can be incorporated without departing from the scope of the invention.

What is claimed is:

1. A waste water filtration tank for filtering solids from effluent, the tank comprising:

an inlet;

first and second outlets in fluid communication with the inlet;

a filtering screen located between the inlet and first outlet and having an outlet side and an inlet side;

flushing means adapted to backflush filtered liquid through said filtering screen from said outlet side and out through said second outlet when said second outlet is opened; and urging means for opening said second outlet, the flushing means comprising:

detecting means for detecting a predetermined degree of contamination of the filtering screen, and latch means coupled to said detecting means and said urging means said latch means responsive to said detecting means to release said urging means and cause said second outlet to open.

2. The tank of claim 1, wherein the detecting means comprises:

a first chamber in fluid communication with the inlet;

a second chamber separated from the first chamber by a barrier means; and a float positioned in the second chamber and adapted to actuate the latch means.

3. The tank of claim 2, wherein the float actuates the latch means when the level of liquid in the second chamber reaches a preset level.

4. The tank of claim 2, wherein the detecting means further comprises a beam member connected to the float, the beam member pivoting under the action of the float to actuate the latch means.

5. The tank of claim 2, wherein the flushing means further comprises a dump valve located in the second chamber.

6. The tank of claim 1, wherein the flushing means further comprises a sluice gate, the sluice gate being movable between first and second positions which correspond to closed and open states of the second outlet, respectively, the sluice gate moving to the second position from the first position under the action of the urging means.

7. The tank of claim 6, wherein the latch means comprises at least one latch and a biasing means biasing the latch into contact with the sluice gate, wherein the latch retains the sluice gate in the first position until the latch is acted upon by the detecting means.

8. The tank of claim 1, further comprising an overflow chamber located between the filtering screen and first outlet.

9. The tank of claim 1, wherein the liquid pressure on the inlet side of the filtering screen increases as the degree of contamination of the filtering screen increases.

* * * * *